United States Patent
Kracke

(10) Patent No.: US 8,276,842 B2
(45) Date of Patent: Oct. 2, 2012

(54) DUAL ACTUATOR DRIVE ASSEMBLY WITH SYNCHRONIZATION SHAFT

(75) Inventor: Jeremy Alan George Kracke, Stone (GB)

(73) Assignee: Goodrich Actuation Systems Limited (GB)

( * ) Notice: Subject to any disclaimer, the term of this patent is extended or adjusted under 35 U.S.C. 154(b) by 395 days.

(21) Appl. No.: 12/643,291

(22) Filed: Dec. 21, 2009

(65) Prior Publication Data

US 2011/0001015 A1    Jan. 6, 2011

(30) Foreign Application Priority Data

Dec. 23, 2008   (GB) .................................. 0823392.6

(51) Int. Cl.
*B64C 9/04* (2006.01)
(52) U.S. Cl. ..................... 244/99.4; 244/99.2; 244/99.3
(58) Field of Classification Search ................. 244/99.2, 244/99.3
See application file for complete search history.

(56) References Cited

U.S. PATENT DOCUMENTS

| | | | | |
|---|---|---|---|---|
| 3,272,090 A * | 9/1966 | Ellis | ................................ | 92/140 |
| 4,470,569 A * | 9/1984 | Shaffer et al. | .................. | 244/214 |
| 4,669,687 A | 6/1987 | Rudolph | | |
| 4,715,567 A | 12/1987 | Poccard | | |
| 4,971,267 A | 11/1990 | Fulton | | |
| 4,979,700 A * | 12/1990 | Tiedeman et al. | ........... | 244/99.2 |
| 5,344,103 A * | 9/1994 | Fitzgibbon et al. | ........... | 244/213 |
| 5,743,490 A * | 4/1998 | Gillingham et al. | ......... | 244/99.9 |
| 5,971,267 A * | 10/1999 | Beckmann | ....................... | 232/39 |
| 6,227,487 B1 * | 5/2001 | Clark | .......................... | 244/99.12 |
| 6,260,799 B1 * | 7/2001 | Russ | ................................ | 244/49 |
| 6,705,570 B1 * | 3/2004 | Degenholtz et al. | ......... | 244/99.2 |
| 6,804,586 B2 * | 10/2004 | Richter et al. | .................... | 701/3 |
| 6,824,099 B1 | 11/2004 | Jones | | |
| 6,923,405 B2 * | 8/2005 | Cline et al. | .................... | 244/99.4 |
| 7,063,292 B2 * | 6/2006 | Perez-Sanchez | ............. | 244/216 |
| 7,338,018 B2 * | 3/2008 | Huynh et al. | .................. | 244/215 |
| 7,556,224 B2 * | 7/2009 | Johnson et al. | ............... | 244/175 |
| 7,837,144 B2 * | 11/2010 | Kothera et al. | ............... | 244/99.2 |
| 8,104,710 B2 * | 1/2012 | Harvey et al. | ................. | 244/99.2 |
| 2002/0047068 A1 * | 4/2002 | Uchida et al. | ................ | 244/75 R |
| 2003/0080246 A1 * | 5/2003 | Koizumi et al. | ............. | 244/75 R |
| 2004/0200928 A1 | 10/2004 | Degenholtz | | |
| 2005/0116095 A1 * | 6/2005 | Cline et al. | .................... | 244/75 R |
| 2008/0128548 A1 * | 6/2008 | Simkulet | ......................... | 244/87 |
| 2011/0220762 A1 * | 9/2011 | Gyuricsko et al. | ........... | 244/99.3 |

FOREIGN PATENT DOCUMENTS

DE    2039605    3/2009
EP    1547917    6/2005

OTHER PUBLICATIONS

European Search Report for EP09252806, dated May 25, 2011.

* cited by examiner

*Primary Examiner* — Timothy D Collins
*Assistant Examiner* — Timothy Schwarz
(74) *Attorney, Agent, or Firm* — Andrus, Sceales, Starke & Sawall, LLP

(57) ABSTRACT

A drive arrangement comprising first and second actuators (24) arranged to drive respective output members (22) for movement, first and second synchronization arrangements (34) associated with respective ones of the first and second actuators (24), and a synchronization shaft (36) interconnecting the synchronization arrangements (34).

6 Claims, 3 Drawing Sheets

DUAL ACTUATOR DRIVE ASSEMBLY WITH SYNCHRONIZATION SHAFT

BACKGROUND

This invention relates to a drive arrangement and in particular to a drive arrangement suitable for use in driving the control surfaces of an aircraft wing.

Each wing of a large aircraft typically carries two or more high-lift, trailing edge control surfaces or flaps which are moved, simultaneously and at the same speed, from a stowed position to a deployed position to increase lift, for example when the aircraft is travelling at relatively low speeds such as during take-off and landing. Often, a single synchronized drive arrangement is used to drive the flaps for movement. It is usual to incorporate arrangements operable such that, in the event of a failure or breakage in the drive arrangements associated with the flaps, the flaps are held against movement so as to avoid the occurrence of a so-called skew condition that can adversely affect the stability of the aircraft. A number of arrangements are known which, for example, link the adjacent ends of the flaps to one another to prevent or restrict relative movement therebetween, and which cause the drive arrangements associated with the flaps to be locked against further movement in the event that it is detected or sensed that one or more of the flaps is becoming skewed, thereby avoiding worsening the skew. U.S. Pat. No. 4,715,567 describes an arrangement of this general type.

Where modern composite materials are used in the wing, and for accelerated trailing edge vortex decay, it has been found to be desirable to move the flaps on the wing at different times and/or through different distances and/or at different speeds, whilst maintaining symmetry between the wings. For example, it may be desired to deploy the inboard flaps of each wing whilst holding the outboard flaps in their stowed positions. Such an operating mode will typically result in less bending or flexing of the wing due to the majority of the applied aerodynamic loading occurring close to the wing roots, less being applied towards the wing tips.

Clearly, as the adjacent flaps do not move simultaneously and at the same speed, known systems which rely on locking together and/or sensing relative movement between the adjacent edges of a pair of flaps cannot be used to sense or avoid a skew condition. Further, the requirement to allow the flaps to be driven independently prevents the known synchronous drive arrangement from being used.

The use of separate motor driven actuators adjacent each end of each flap has been considered. For example, by using a dual load path type actuator, a separate tie bar is able to transmit applied loadings, preventing uncontrolled movement of the flap, in the event of an actuator failure. However, such actuators are relatively heavy and so the provision of two such actuators associated with each flap is undesirable.

SUMMARY OF THE INVENTION

It is an object of the invention to provide an alternative form of drive arrangement in which at least some of the above-mentioned disadvantages are overcome or are of reduced effect.

According to the present invention there is provided a drive arrangement comprising first and second actuators arranged to drive respective output members for movement, first and second synchronization arrangements associated with respective ones of the first and second actuators, and a synchronization shaft interconnecting the synchronization arrangements.

In such an arrangement, in normal operation the synchronization shaft carries very little or no load. In the event of a failure in one of the actuators or linkages which could otherwise result in a skew condition arising in an associated flap, the synchronization arrangements and synchronization shaft transmit loadings between the ends of the flap, resisting skewing of the flap. A brake associated with the operational actuator may be used to resist flap movement.

Conveniently the first and second actuators are driven by a common drive shaft. The synchronization shaft may be of tubular form arranged coaxially with the drive shaft.

The invention further relates to a wing flap arrangement comprising a flap, first and second actuators operable to drive the flap for movement, each actuator having an output member connected to the flap, the output members being associated with respective ends of the flap, first and second synchronization arrangements associated with respective ends of the flap, and a synchronization shaft interconnecting the synchronization arrangements and operable to resist relative movement between the respective ends of the flap.

BRIEF DESCRIPTION OF THE DRAWINGS

The invention will further be described, by way of example, with reference to the accompanying drawings, in which.

DETAILED DESCRIPTION

Figure 1:
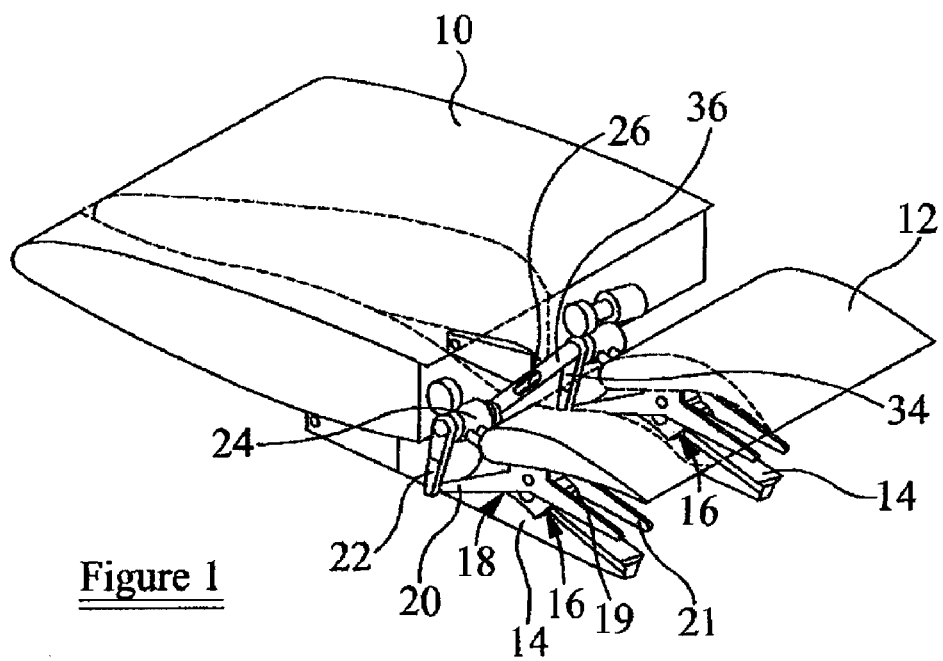
FIGS. 1 and 2 are views illustrating part of a wing and associated flap in stowed and deployed positions.
Figure 2:
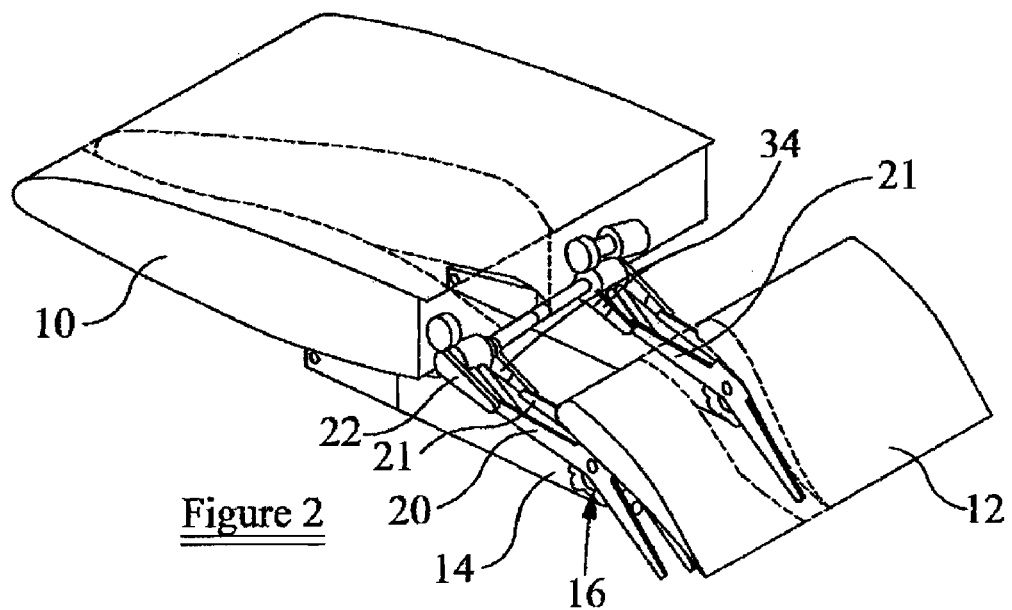

FIGS. 1 and 2 illustrate part of an aircraft wing 10 with which a trailing edge control surface or flap 12 is associated. FIG. 1 illustrates the wing 10 with the flap 12 in a stowed position, FIG. 2 illustrating the flap 12 in a deployed position. The flap 12, which may be several meters in length, is secured to the wing 10 by first and second mounting arrangements, each comprising a support track 14 secured to the wing 10 and along which a follower or trolley 16 can travel. The respective followers 16 are pivotally mounted to the flap 12 at spaced locations along its length by pivotal mounting arrangements 18. As illustrated, a pivotal mounting arrangement 18 includes an elongate arm or link 20 which is pivotally connected to an output member in the form of a link 22 angularly movable by an actuator 24 which is driven for angular movement by a drive shaft 26. By comparing FIG. 1 with FIG. 2, it will be apparent that rotation of the drive shaft 26 causes angular and translational movement of the links 20, 22 which serves to drive the follower 16 along the associated track 14 and which also causes pivotal movement of the pivotal mounting arrangement 18. As a result, the flap 12 is both extended and its angle of attack is altered when moved from its stowed position as shown in FIG. 1 to its deployed position as shown in FIG. 2.

Although FIGS. 1 and 2 illustrate only a single flap 12, it will be appreciated that two or more such flaps may be provided on the wing 10 adjacent one another and, as described hereinbefore, the flaps 12 may be arranged to be driven independently of one another if desired.

Figure 3:
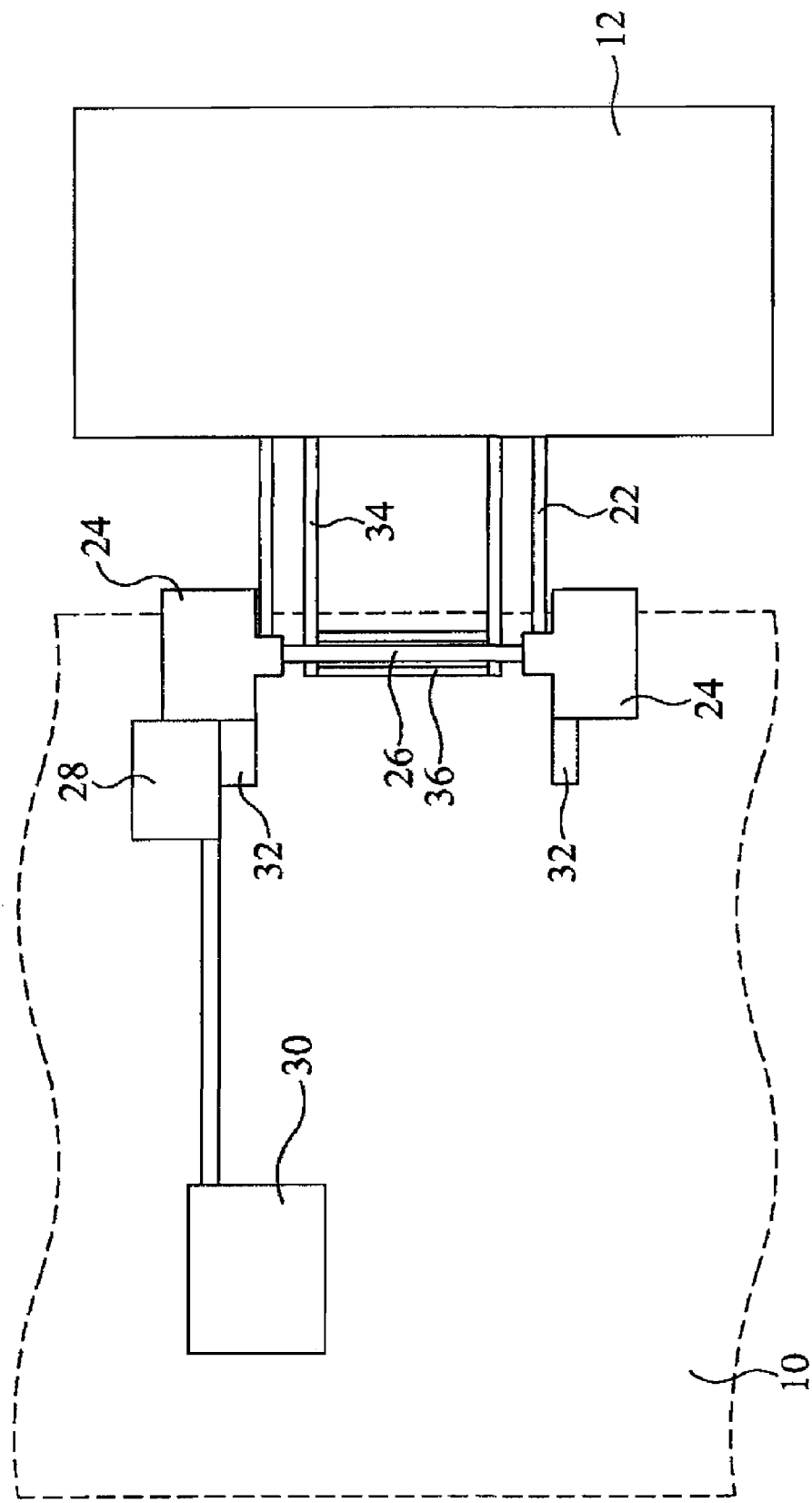
FIG. 3 is a diagrammatic view illustrating one embodiment of the invention.

Referring next to FIG. 3 the drive arrangement shown in FIGS. 1 and 2 is illustrated diagrammatically, and it is clear from FIG. 3 that a separate motor 28 is used to drive the actuators 24 for rotation under the control of an appropriate control unit 30, and also that each of the actuators 24 has a brake 32 associated therewith.

Each of the actuators 24 is provided with an associated synchronization arrangement 34 in the form of a linkage connected at one end to the flap 12 via a second mounting 19 and associated link arm 21 and at the other end to a synchronization shaft 36 which, in this embodiment, is of hollow form and is arranged coaxially with the drive shaft 26. The linkage arrangements 34 are substantially identical to one another. The synchronization shaft 36, which may extend over almost the full length of the flap 12, conveniently takes the form of a torque tube, for example of carbon fibre form.

In normal use, starting from the stowed position in FIG. 1, if it is desired to deploy the flap 12 then the motor 28 is driven under the control of the controller 30 to cause operation of the actuators 24 to move the output members 22 thereof towards the position shown in FIG. 2. As described hereinbefore such movement will result in deployment of the flap 12.

The movement of the flap 12 causes extension of the synchronization linkage arrangements 34. As each linkage arrangement 34 is secured to the synchronization shaft 36, it will be appreciated that rotation of the synchronization shaft 36 will also occur. If the flap 12 is deployed normally, then both synchronization linkage arrangements 34 will follow the same path of movement and substantially no load will be transmitted therebetween along the synchronization shaft 36.

In the event that one or other of the actuators 24 fails, or there is a failure or jam in the associated follower 16 or pivotal mounting 18, then there is a risk that continued operation of the motor 28 to drive the flap 12 for movement may result in the flap 12 becoming skewed. Further, if the failure is such that an end of the flap 12 is able to move independently of the operation of the associated actuator 24, particularly in the event of the failure of a link arm 20 or 22, then the aerodynamic forces experienced by the flap 12 may result in uncontrolled movement of the flap 12 with, again, the attendant risk of the flap 12 becoming skewed. In accordance with the invention, such skewing movement results in the first and second synchronization linkage arrangements 34 being urged to move independently of one another. However, as the first and second synchronization linkage arrangements 34 are coupled to one another by means of the synchronization shaft 36, such skewing motion is prevented or limited to a very restricted level. Further, in the event that the failure or jam is sensed, then the brake 32 associated with the functioning one of the actuators 24 can be applied to resist further movement of the flap 12, the operation of the synchronization linkage arrangements 32 and synchronization shaft 36 ensuring that the braking load arising from the operation of the brake 32 is applied to both ends of the flap 12, resisting the occurrence of a skew condition.

It will be appreciated that as the flaps 12 associated with the wing 10 are driven independently of one another, the occurrence of a drive failure to one of the flaps 12 need not prevent operation of the other flaps associated with the wing 10. However, it is desirable to ensure that the corresponding flaps on both wings of the aircraft occupy the same positions at all time. Thus if a failure results in the flap 12 of one of the wings becoming inoperable, then the corresponding flap on the other wing will be held in substantially the same position as the failed flap.

It will be appreciated that the arrangement described hereinbefore is advantageous in that the avoidance of a skew condition can be achieved without requiring interaction between a plurality of flaps. Thus the system can be used on an aircraft of the type in which several flaps are associated with each wing, the flaps being held in different positions when desired. For example, the invention may be applied to wings of the type in which a composite material is used and in which it is desired to deploy the flaps adjacent the wing roots to a greater extent than those adjacent the wing tips to reduce bending of the wings, if desired.

Figure 4:
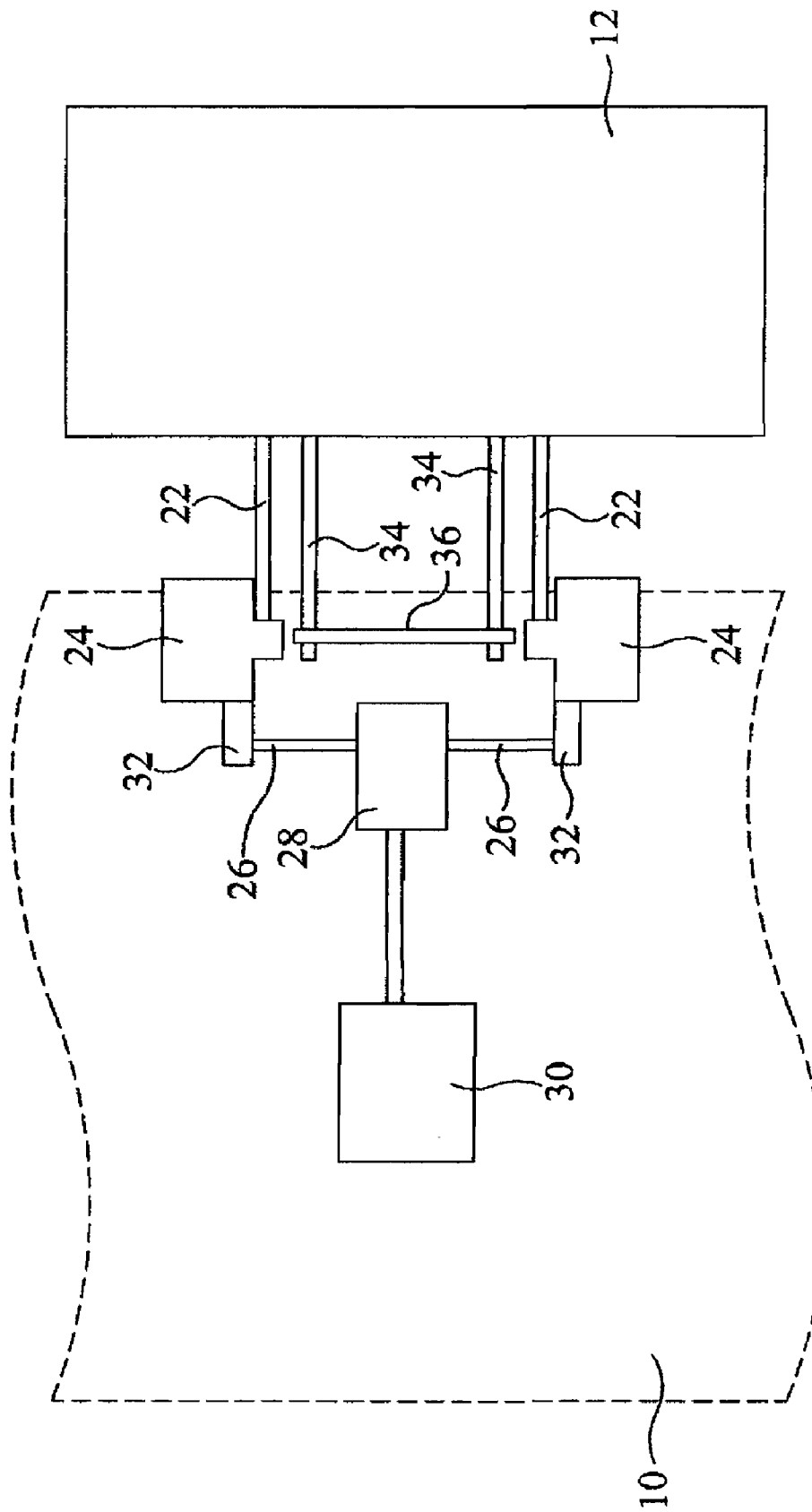
FIG. 4 is a view similar to FIG. 3 illustrating another embodiment.

A range of modifications or alterations may be made to the arrangement described hereinbefore without departing from the scope of the invention. For example, FIG. 4 illustrates a modification to the arrangement illustrated in FIG. 3. In the arrangement of FIG. 4, the motor 28 is arranged to drive both of the actuators 24 via respective drive shafts 26 rather than directly driving one of the actuators 24 as in the arrangement of FIG. 3.

In either arrangement, a sensor may be provided to detect the application of a torque between the ends of the synchronization shaft 36. In the event that such a torque is sensed, this can be used to provide an indication that a failure which could result in a skew condition arising has occurred, which can then be used by the control unit 30 or other controller to terminate the application of drive to the actuators 24 and to operate the brakes 32. Conveniently the sensor may comprise a strain gauge associated with the synchronization shaft 36 or linkage arrangements 34.

It is desirable that a self-test arrangement should be incorporated into the drive arrangement so as to permit the sensing of dormant failures in the synchronization linkage arrangements 34 and synchronization shaft 36. For example, a spring loading mechanism could be provided to resist movement of one end of the flap 12 or link 22 as it approaches its fully retracted position, urging the flap 12 towards a slightly skewed condition. If the synchronization linkage arrangements 34 and synchronization shaft 36 are functioning normally, then the occurrence of such a skewed condition will be sensed by the sensor arrangement providing an indication that the drive arrangement is functioning normally.

One additional advantage of the arrangement described hereinbefore is that the aircraft manufacturer can be supplied with a sub-system comprising the flap 12 and associated drive arrangement, linkages and support track 14, as a fully assembled and pre-adjusted sub-assembly. The sub-assembly then need only be mounted upon the aircraft wing. As a result, the assembly process can be much simplified compared to arrangements where the actuators need to be mounted separately to the wing and then have the flap secured thereto. In addition, the synchronization shaft 36 may function to provide the sub-assembly with additional rigidity prior to being mounted to the aircraft wing, thereby avoiding the risk of the application of stresses to the flap 12 which could cause damage thereto.

A range of other modifications or alterations may be made to the arrangements described hereinbefore if desired.

The invention claimed is:

1. A drive arrangement comprising first and second actuators arranged to drive respective output members for movement, first and second synchronization arrangements associated with respective ones of the first and second actuators, and a synchronization shaft interconnecting the synchronization arrangements, wherein the first and second actuators are interconnected by a common drive shaft, the synchronization shaft being of tubular form arranged coaxially with the drive shaft.

2. An arrangement according to claim 1, further comprising a brake associated with each actuator.

3. An arrangement according to claim 1, wherein each synchronization arrangement comprises a linkage connected to the synchronization shaft.

4. An arrangement according to claim 3, wherein the linkage is secured to the synchronization shaft for angular movement therewith.

5. An arrangement according to claim 3, wherein the linkage is further connected, in use, to a link associated with a wing flap.

6. A wing flap arrangement comprising a flap, first and second actuators operable to drive the flap for movement, each actuator having an output member connected to the flap, the output members being associated with respective ends of the flap, first and second synchronization arrangements associated with respective ends of the flap, and a synchronization shaft interconnecting the synchronization arrangements and operable to resist relative movement between the respective ends of the flap, wherein the first and second actuators are interconnected by a common drive shaft, the synchronization shaft being of tubular form arranged coaxially with the drive shaft.

* * * * *